United States Patent
Hsieh et al.

(10) Patent No.: US 7,464,553 B2
(45) Date of Patent: Dec. 16, 2008

(54) AIR-ASSISTED FUEL INJECTOR FOR MIXER ASSEMBLY OF A GAS TURBINE ENGINE COMBUSTOR

(75) Inventors: Shih-Yang Hsieh, West Chester, OH (US); George Chia-Chun Hsiao, West Chester, OH (US); Shui-Chi Li, West Chester, OH (US); Hukam Chand Mongia, West Chester, OH (US)

(73) Assignee: General Electric Company, Schenectady, NY (US)

( * ) Notice: Subject to any disclaimer, the term of this patent is extended or adjusted under 35 U.S.C. 154(b) by 616 days.

(21) Appl. No.: 11/188,470

(22) Filed: Jul. 25, 2005

(65) Prior Publication Data

US 2007/0028617 A1    Feb. 8, 2007

(51) Int. Cl.
*F23R 3/14* (2006.01)
(52) U.S. Cl. .................................... 60/748; 60/740
(58) Field of Classification Search ............... 60/748, 60/740
See application file for complete search history.

(56) References Cited

U.S. PATENT DOCUMENTS

| | | | | |
|---|---|---|---|---|
| 3,972,182 | A * | 8/1976 | Salvi ........................... | 60/743 |
| 5,321,951 | A * | 6/1994 | Falls et al. .................... | 60/748 |
| 6,279,323 | B1 * | 8/2001 | Monty et al. .................. | 60/752 |
| 6,354,072 | B1 | 3/2002 | Hura | |
| 6,363,726 | B1 | 4/2002 | Durbin et al. | |
| 6,367,262 | B1 | 4/2002 | Mongia et al. | |
| 6,381,964 | B1 | 5/2002 | Pritchard, Jr. et al. | |
| 6,389,815 | B1 * | 5/2002 | Hura et al. ..................... | 60/746 |
| 6,418,726 | B1 | 7/2002 | Foust et al. | |
| 6,453,660 | B1 | 9/2002 | Johnson et al. | |
| 6,484,489 | B1 | 11/2002 | Foust et al. | |
| 6,865,889 | B2 | 3/2005 | Mancini et al. | |
| 6,898,938 | B2 * | 5/2005 | Mancini et al. ............... | 60/748 |
| 7,246,494 | B2 * | 7/2007 | Currin et al. .................. | 60/748 |
| 2007/0017224 | A1 * | 1/2007 | Li et al. ......................... | 60/748 |
| 2007/0028595 | A1 * | 2/2007 | Mongia et al. ............. | 60/226.1 |
| 2007/0028618 | A1 * | 2/2007 | Hsiao et al. ................... | 60/737 |

(Continued)

*Primary Examiner*—William H Rodriguez
(74) *Attorney, Agent, or Firm*—William Scott Anders; James P. Davidson

(57) ABSTRACT

A mixer assembly for use in a combustion chamber of a gas turbine engine includes a pilot mixer, a main mixer, and a fuel manifold positioned between the pilot mixer and main mixer. The pilot mixer includes an annular pilot housing having a hollow interior and a pilot fuel nozzle mounted in the housing and adapted for dispensing droplets of fuel to the hollow interior of the pilot housing. The main mixer includes: a main housing surrounding the pilot housing and defining an annular cavity; a plurality of fuel injection ports for introducing fuel into the cavity; a post member associated with and extending from each fuel injection port to an inner surface of said annular cavity, the post member including an inner passage therethrough in flow communication with the fuel injection port; a passage surrounding each post member, wherein air is provided therefrom to envelop fuel injected into the annular cavity; and, a swirler arrangement including at least one swirler positioned upstream from the fuel injection ports, wherein each swirler of the arrangement has a plurality of vanes for swirling air traveling through such swirler to mix air and the droplets of fuel dispensed by the fuel injection ports. The air through the passages is either injected substantially straight through or swirled a predetermined amount.

20 Claims, 11 Drawing Sheets

U.S. PATENT DOCUMENTS

2007/0028620 A1* 2/2007 McMasters et al. ........... 60/748
2007/0028624 A1* 2/2007 Hsieh et al. .................... 60/776
2007/0137207 A1* 6/2007 Mancini et al. ................ 60/737
2007/0271927 A1* 11/2007 Myers et al. ................... 60/776
2007/0289305 A1* 12/2007 Oda et al. ...................... 60/748

* cited by examiner

AIR-ASSISTED FUEL INJECTOR FOR MIXER ASSEMBLY OF A GAS TURBINE ENGINE COMBUSTOR

BACKGROUND OF THE INVENTION

The present invention relates to a staged combustion system in which the production of undesirable combustion product components is minimized over the engine operating regime and, more particularly, to a fuel injection arrangement for the main mixer of such system which enhances fuel penetration into an annular cavity for improved mixing of fuel and air therein.

Air pollution concerns worldwide have led to stricter emissions standards both domestically and internationally. Aircraft are governed by both Environmental Protection Agency (EPA) and International Civil Aviation Organization (ICAO) standards. These standards regulate the emission of oxides of nitrogen (NOx), unburned hydrocarbons (HC), and carbon monoxide (CO) from aircraft in the vicinity of airports, where they contribute to urban photochemical smog problems. Such standards are driving the design of gas turbine engine combustors, which also must be able to accommodate the desire for efficient, low cost operation and reduced fuel consumption. In addition, the engine output must be maintained or even increased.

It will be appreciated that engine emissions generally fall into two classes: those formed because of high flame temperatures (NOx) and those formed because of low flame temperatures which do not allow the fuel-air reaction to proceed to completion (HC and CO). Balancing the operation of a combustor to allow efficient thermal operation of the engine, while simultaneously minimizing the production of undesirable combustion products, is difficult to achieve. In that regard, operating at low combustion temperatures to lower the emissions of NOx can also result in incomplete or partially incomplete combustion, which can lead to the production of excessive amounts of HC and CO, as well as lower power output and lower thermal efficiency. High combustion temperature, on the other hand, improves thermal efficiency and lowers the amount of HC and CO, but oftentimes results in a higher output of NOx.

One way of minimizing the emission of undesirable gas turbine engine combustion products has been through staged combustion. In such an arrangement, the combustor is provided with a first stage burner for low speed and low power conditions so the character of the combustion products is more closely controlled. A combination of first and second stage burners is provided for higher power output conditions, which attempts to maintain the combustion products within the emissions limits.

Another way that has been proposed to minimize the production of such undesirable combustion product components is to provide for more effective intermixing of the injected fuel and the combustion air. In this way, burning occurs uniformly over the entire mixture and reduces the level of HC and CO that results from incomplete combustion. While numerous mixer designs have been proposed over the years to improve the mixing of the fuel and air, improvement in the levels of undesirable NOx formed under high power conditions (i.e., when the flame temperatures are high) is still desired.

One mixer design that has been utilized is known as a twin annular premixing swirler (TAPS), which is disclosed in the following U.S. Pat. Nos.: 6,354,072; 6,363,726; 6,367,262; 6,381,964; 6,389,815; 6,418,726; 6,453,660; 6,484,489; and, 6,865,889. Published U.S. patent application 2002/0178732 also depicts certain embodiments of the TAPS mixer. It will be understood that the TAPS mixer assembly includes a pilot mixer which is supplied with fuel during the entire engine operating cycle and a main mixer which is supplied with fuel only during increased power conditions of the engine operating cycle. Because improvements in NOx emissions during high power conditions are of current primary concern, modification of the main mixer in the assembly is needed to maximize fuel-air mixing therein.

As shown in the '964 and '815 patents, fuel is injected from a fuel manifold into the main mixer by means of a plurality of fuel injection ports. Such ports are generally located downstream of a ramp portion and terminate beneath the inner surface of the annular mixing cavity. It has been found that fuel injected into such annular cavity has a tendency to break apart more quickly than desired and/or reside too closely to the inner radial surface thereof In either event, the ability of the fuel and air in the annular cavity to form a more uniform mixture is impeded.

Accordingly, there is a desire for a gas turbine engine combustor in which the production of undesirable combustion product components is minimized over a wide range of engine operating conditions. More specifically, a mixer assembly for such gas turbine engine combustor is desired which provides increased mixing of fuel and air so as to create a more uniform mixture. It is desired that the fuel spray be injected further into the annular cavity of the main mixer and that a flow field be created therein which is conducive to retarding break-up of the fuel spray.

BRIEF SUMMARY OF THE INVENTION

In a first exemplary embodiment of the invention, a mixer assembly for use in a combustion chamber of a gas turbine engine is disclosed as including a pilot mixer, a main mixer, and a fuel manifold positioned between the pilot mixer and main mixer. The pilot mixer includes an annular pilot housing having a hollow interior and a pilot fuel nozzle mounted in the housing and adapted for dispensing droplets of fuel to the hollow interior of the pilot housing. The main mixer includes: a main housing surrounding the pilot housing and defining an annular cavity; a plurality of fuel injection ports for introducing fuel into the cavity; a post member associated with and extending from each fuel injection port to an inner surface of the annular cavity, the post member including an inner passage therethrough in flow communication with the fuel injection port; a passage surrounding each post member, wherein air is provided therefrom to envelop fuel injected into the annular cavity; and, a swirler arrangement including at least one swirler positioned upstream from the fuel injection ports, wherein each swirler of the arrangement has a plurality of vanes for swirling air traveling through such swirler to mix air and the droplets of fuel dispensed by the fuel injection ports. The air flowing through the passages surrounding the post members is either injected substantially straight through or swirled a predetermined amount.

In a second exemplary embodiment of the invention, a mixer assembly for use in a combustion chamber of a gas turbine engine is disclosed as including a pilot mixer, a main mixer, and a fuel manifold positioned between the pilot mixer and main mixer. The pilot mixer includes an annular pilot housing having a hollow interior and a pilot fuel nozzle mounted in the housing and adapted for dispensing droplets of fuel to the hollow interior of the pilot housing. The main mixer includes: a main housing surrounding the pilot housing and defining an annular cavity; a plurality of fuel injection ports for introducing fuel into the cavity; a plurality of circumferentially spaced passages located in a downstream portion of the annular cavity, wherein air is provided to force a fuel/air mixture from residing along an inner surface of the annular cavity; and, a swirler arrangement including at least one swirler positioned upstream from the fuel injection ports, wherein each swirler of the arrangement has a plurality of vanes for swirling air traveling through such swirler to mix air and the droplets of fuel dispensed by the fuel injection ports. The fuel injection ports are in flow communication with the fuel manifold.

DETAILED DESCRIPTION OF THE INVENTION

Figure 1:
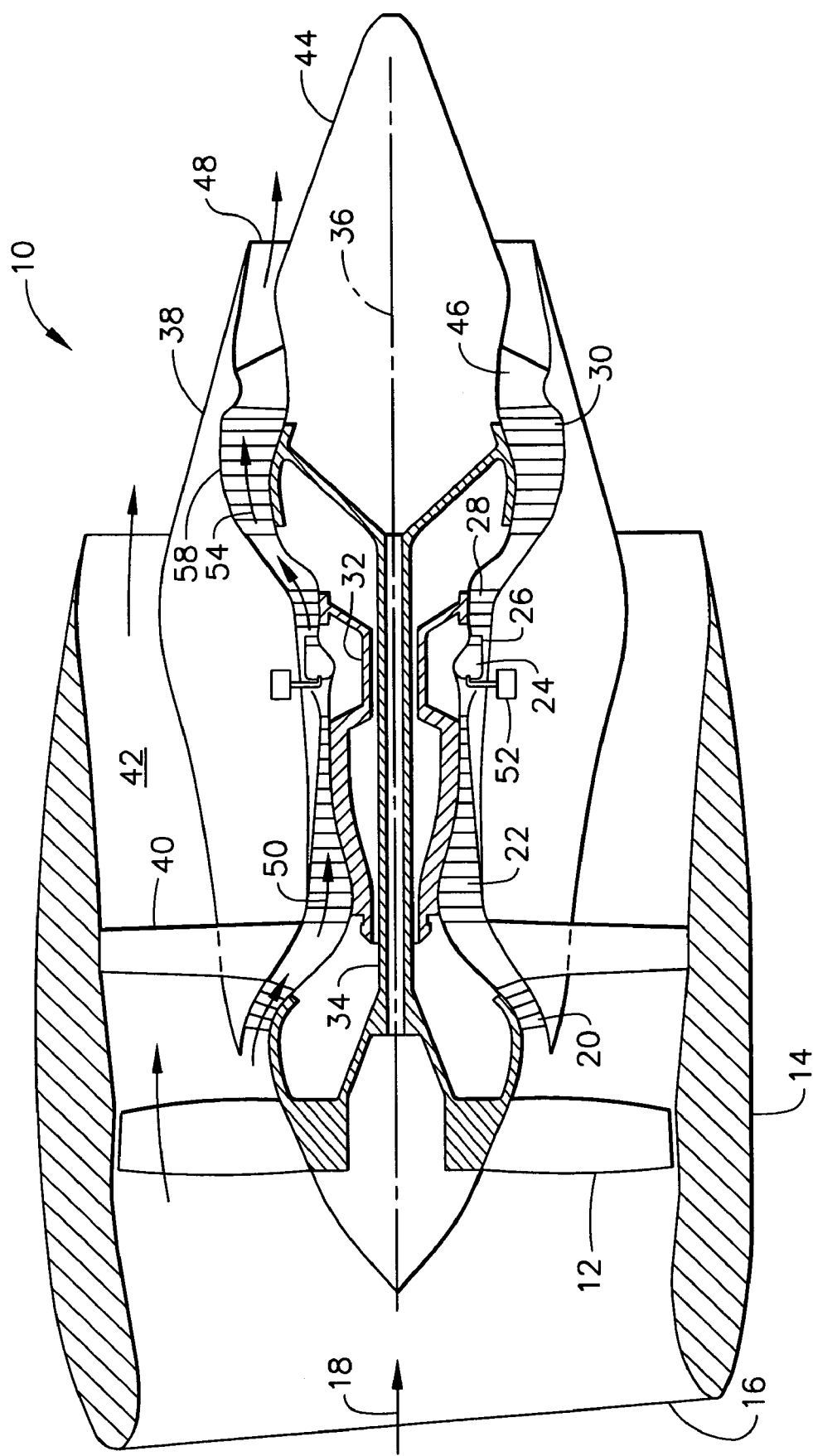
FIG. 1 is a diagrammatic view of a high bypass turbofan gas turbine engine.

Referring now to the drawings in detail, wherein identical numerals indicate the same elements throughout the figures, FIG. 1 depicts in diagrammatic form an exemplary gas turbine engine 10 (high bypass type) utilized with aircraft having a longitudinal or axial centerline axis 12 therethrough for reference purposes. Engine 10 preferably includes a core gas turbine engine generally identified by numeral 14 and a fan section 16 positioned upstream thereof. Core engine 14 typically includes a generally tubular outer casing 18 that defines an annular inlet 20. Outer casing 18 further encloses and supports a booster compressor 22 for raising the pressure of the air that enters core engine 14 to a first pressure level. A high pressure, multi-stage, axial-flow compressor 24 receives pressurized air from booster 22 and further increases the pressure of the air. The pressurized air flows to a combustor 26, where fuel is injected into the pressurized air stream to raise the temperature and energy level of the pressurized air. The high energy combustion products flow from combustor 26 to a first (high pressure) turbine 28 for driving high pressure compressor 24 through a first (high pressure) drive shaft 30, and then to a second (low pressure) turbine 32 for driving booster compressor 22 and fan section 16 through a second (low pressure) drive shaft 34 that is coaxial with first drive shaft 30. After driving each of turbines 28 and 32, the combustion products leave core engine 14 through an exhaust nozzle 36 to provide propulsive jet thrust.

Fan section 16 includes a rotatable, axial-flow fan rotor 38 that is surrounded by an annular fan casing 40. It will be appreciated that fan casing 40 is supported from core engine 14 by a plurality of substantially radially-extending, circumferentially-spaced outlet guide vanes 42. In this way, fan casing 40 encloses fan rotor 38 and fan rotor blades 44. Downstream section 46 of fan casing 40 extends over an outer portion of core engine 14 to define a secondary, or bypass, airflow conduit 48 that provides additional propulsive jet thrust.

From a flow standpoint, it will be appreciated that an initial air flow, presented by arrow 50, enters gas turbine engine 10 through an inlet 52 to fan casing 40. Air flow 50 passes through fan blades 44 and splits into a first compressed air flow (represented by arrow 54) that moves through conduit 48 and a second compressed air flow (represented by arrow 56) which enters booster compressor 22. The pressure of second compressed air flow 56 is increased and enters high pressure compressor 24, as represented by arrow 58. After mixing with fuel and being combusted in combustor 26, combustion products 60 exit combustor 26 and flow through first turbine 28. Combustion products 60 then flow through second turbine 32 and exit exhaust nozzle 36 to provide thrust for gas turbine engine 10.

Figure 2:
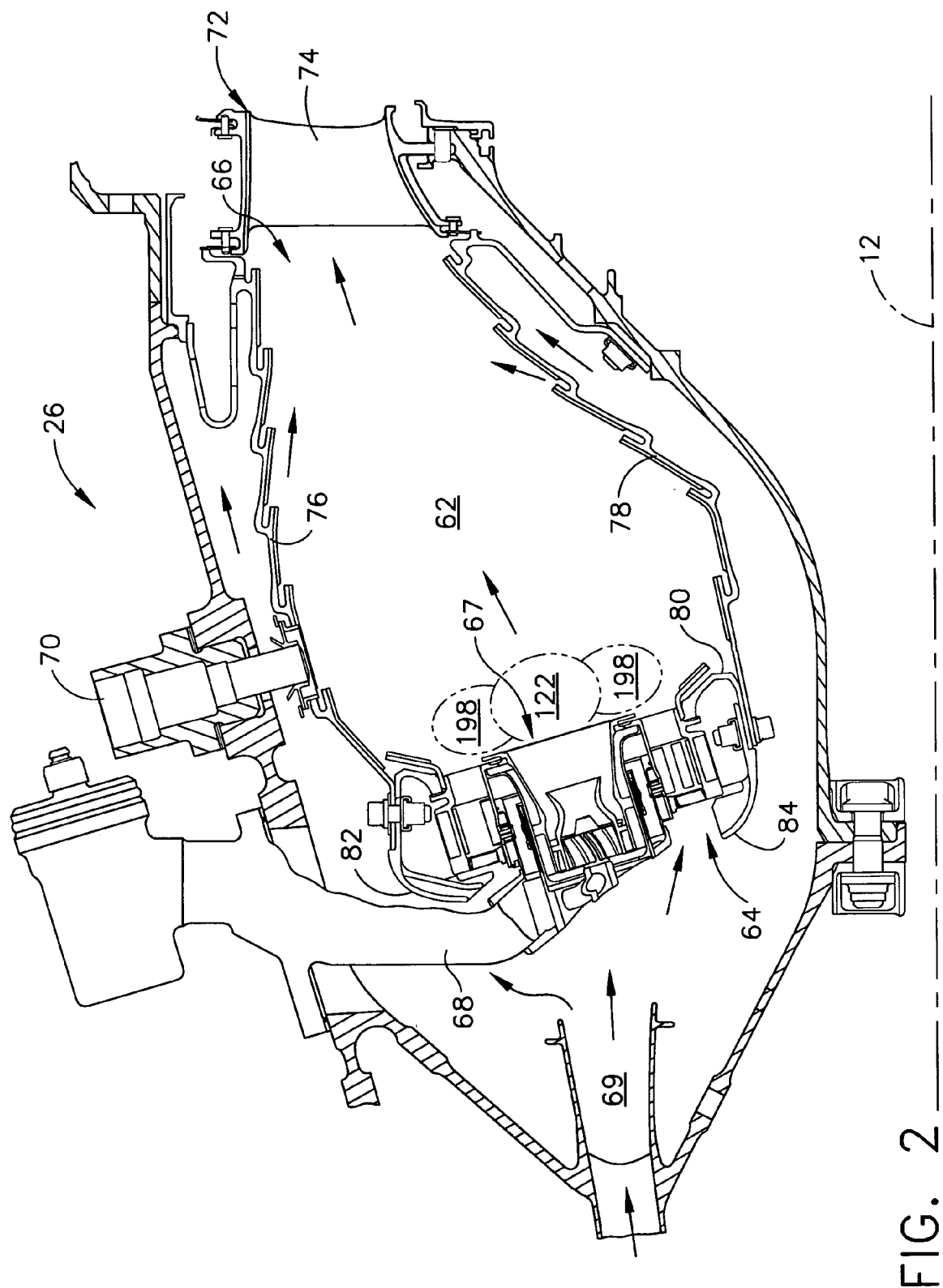
FIG. 2 is a longitudinal, cross-sectional view of a gas turbine engine combustor having a staged arrangement.

As best seen in FIG. 2, combustor 26 includes an annular combustion chamber 62 that is coaxial with longitudinal axis 12, as well as an inlet 64 and an outlet 66. As noted above, combustor 26 receives an annular stream of pressurized air from a high pressure compressor discharge outlet 69. A portion of this compressor discharge air flows into a mixing assembly 67, where fuel is also injected from a fuel nozzle 68 to mix with the air and form a fuel-air mixture that is provided to combustion chamber 62 for combustion. Ignition of the fuel-air mixture is accomplished by a suitable igniter 70, and the resulting combustion gases 60 flow in an axial direction toward and into an annular, first stage turbine nozzle 72. Nozzle 72 is defined by an annular flow channel that includes a plurality of radially-extending, circularly-spaced nozzle vanes 74 that turn the gases so that they flow angularly and impinge upon the first stage turbine blades of first turbine 28. As shown in FIG. 1, first turbine 28 preferably rotates high pressure compressor 24 via first drive shaft 30. Low pressure turbine 32 preferably drives booster compressor 24 and fan rotor 38 via second drive shaft 34.

Combustion chamber 62 is housed within engine outer casing 18 and is defined by an annular combustor outer liner 76 and a radially-inwardly positioned annular combustor inner liner 78. The arrows in FIG. 2 show the directions in which compressor discharge air flows within combustor 26. As shown, part of the air flows over the outermost surface of outer liner 76, part flows into combustion chamber 62, and part flows over the innermost surface of inner liner 78.

Contrary to previous designs, it is preferred that outer and inner liners 76 and 78, respectively, not be provided with a plurality of dilution openings to allow additional air to enter combustion chamber 62 for completion of the combustion process before the combustion products enter turbine nozzle 72. This is in accordance with a patent application entitled "Combustion Liner Having No Dilution Holes," filed concurrently herewith and hereby incorporated by reference, which is also owned by the assignee of the present invention. It will be understood, however, that outer liner 76 and inner liner 78 preferably include a plurality of smaller, circularly-spaced cooling air apertures (not shown) for allowing some of the air that flows along the outermost surfaces thereof to flow into the interior of combustion chamber 62. Those inwardly-directed air flows pass along the inner surfaces of outer and inner liners 76 and 78 that face the interior of combustion chamber 62 so that a film of cooling air is provided therealong.

It will be understood that a plurality of axially-extending mixing assemblies 67 are disposed in a circular array at the upstream end of combustor 26 and extend into inlet 64 of annular combustion chamber 62. It will be seen that an annular dome plate 80 extends inwardly and forwardly to define an upstream end of combustion chamber 62 and has a plurality of circumferentially spaced openings formed therein for receiving mixing assemblies 67. For their part, upstream portions of each of inner and outer liners 76 and 78, respectively, are spaced from each other in a radial direction and define an outer cowl 82 and an inner cowl 84. The spacing between the forwardmost ends of outer and inner cowls 82 and 84 defines combustion chamber inlet 64 to provide an opening to allow compressor discharge air to enter combustion chamber 62.

Figure 3:
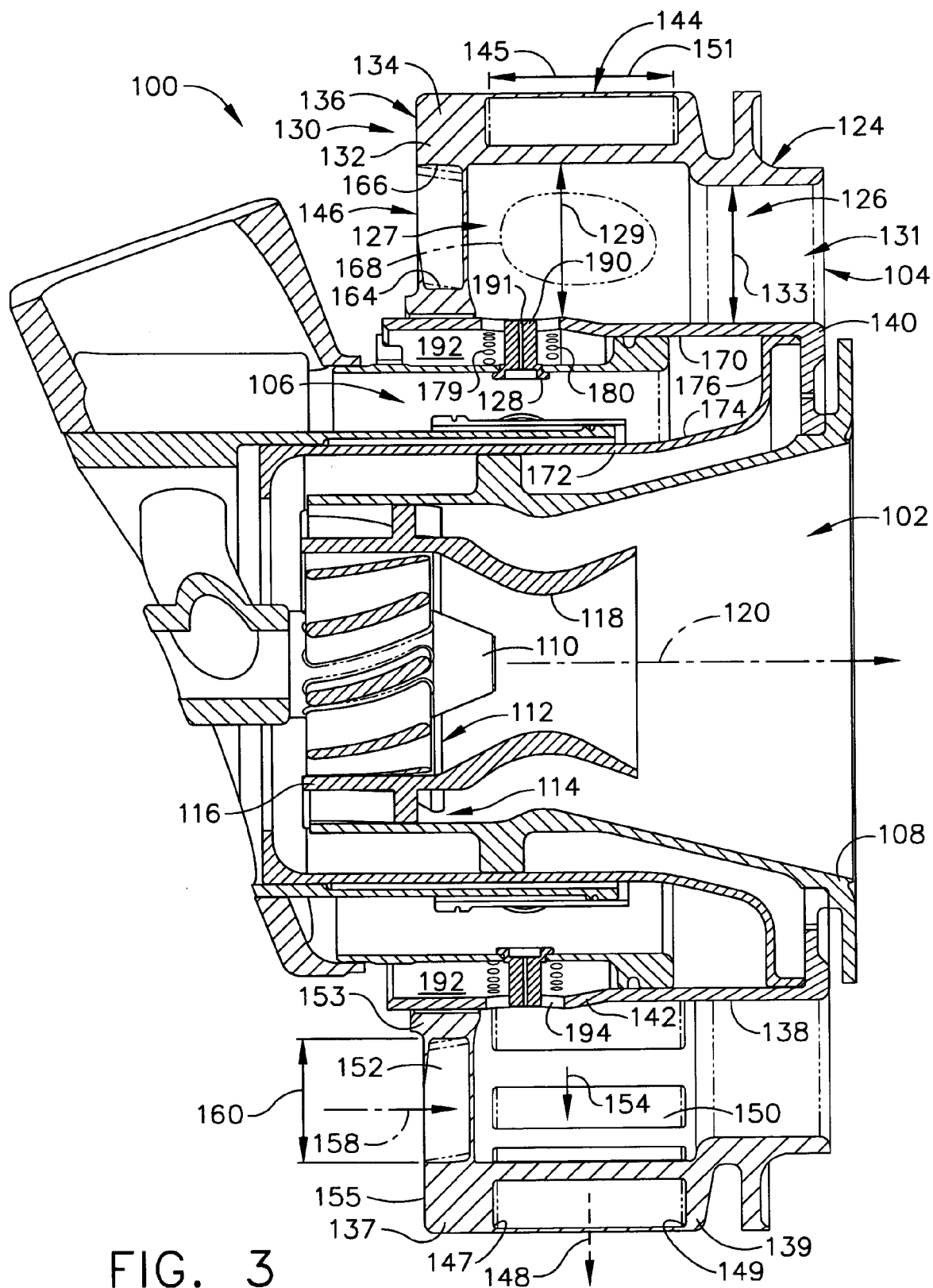
FIG. 3 is an enlarged, cross-sectional view of the mixer assembly depicted in FIG. 2.

A mixing assembly 100 in accordance with one embodiment of the present invention is shown in FIG. 3. Mixing assembly 100 preferably includes a pilot mixer 102, a main mixer 104, and a fuel manifold 106 positioned therebetween. More specifically, it will be seen that pilot mixer 102 preferably includes an annular pilot housing 108 having a hollow interior, a pilot fuel nozzle 110 mounted in housing 108 and adapted for dispensing droplets of fuel to the hollow interior of pilot housing 108. Further, pilot mixer preferably includes a first swirler 112 located at a radially inner position adjacent pilot fuel nozzle 110, a second swirler 114 located at a radially outer position from first swirler 112, and a splitter 116 positioned therebetween. Splitter 116 extends downstream of pilot fuel nozzle 110 to form a venturi 118 at a downstream portion. It will be understood that first and second pilot swirlers 112 and 114 are generally oriented parallel to a centerline axis 120 through mixing assembly 100 and include a plurality of vanes for swirling air traveling therethrough. Fuel and air are provided to pilot mixer 102 at all times during the engine operating cycle so that a primary combustion zone 122 is produced within a central portion of combustion chamber 62 (see FIG. 2).

Main mixer 104 further includes an annular main housing 124 radially surrounding pilot housing 108 and defining an annular cavity 126, a plurality of fuel injection ports 128 which introduce fuel into annular cavity 126, and a swirler arrangement identified generally by numeral 130. More specifically, annular cavity 126 is preferably defined by an upstream wall 132 and an outer radial wall 134 of a swirler housing 136, and by an inner radial wall 138 of a centerbody outer shell 140. It will be seen that inner radial wall 138 preferably also includes a ramp portion 142 located at a forward position along annular cavity 126. It will be appreciated that annular cavity 126 gently transitions from an upstream end 127 having a first radial height 129 to a downstream end 131 having a second radial height 133. The difference between first radial height 129 and second radial height 133 of annular cavity 126 is due primarily to outer radial wall 134 of swirler housing 136 incorporating a swirler 144 therein at upstream end 127. In addition, ramp portion 142 of inner radial wall 138 is preferably located within an axial length 145 of swirler housing 144.

It will be seen in FIGS. 3-6 and 10 that swirler arrangement 130 preferably includes at least a first swirler 144 positioned upstream from fuel injection ports 128. As shown, first swirler 144 is preferably oriented substantially radially to centerline axis 120 through mixer assembly 100 and has an axis 148 therethrough. It will be noted that first swirler 144 includes a plurality of vanes 150 extending between first and second portions 137 and 139 of outer radial wall 134. It will be appreciated that vanes 150 are preferably oriented at an angle of approximately 30-70° with respect to axis 148. Vanes 150 will preferably each have a height 151 which is measured across opposite ends (i.e., in the axial direction relative to centerline axis 120 of mixing assembly 100) that is equivalent to axial length 145 of swirler 144. Since vanes 150 are substantially uniformly spaced circumferentially, a plurality of substantially uniform passages 154 are defined between adjacent vanes 150. It will be noted that vanes 150 preferably extend from upstream end 147 of swirler 144 to downstream end 149 thereof. Nevertheless, vanes 150 may extend only part of the way from upstream end 147 to downstream end 149 so that the tips thereof are stepped or lie on a different annulus. It will further be understood that swirler 144 may include vanes having different configurations so as to shape the passages in a desirable manner, as disclosed in a patent application entitled "Swirler Arrangement For Mixer Assembly Of A Gas Turbine Engine Combustor Having Shaped Passages," which is also filed concurrently herewith by the assignee of the present invention and is hereby incorporated herein.

Swirled air may also be provided at upstream end 127 of annular cavity 126 via a series of passages formed in upstream wall 132 of swirler housing, as shown and described in a patent application entitled, "Mixer Assembly For Combustor Of A Gas Turbine Engine Having A Main Mixer With Improved Fuel Penetration, which is filed concurrently herewith and is owned by the assignee of the present invention. Rather, it is seen from FIGS. 3-7 and 10-11 that a second swirler 146 is preferably provided which is oriented substantially axially to centerline axis 120. Second swirler 146 includes a plurality of vanes 152 extending between inner and outer portions 153 and 155 of upstream wall 132. It will be appreciated that vanes 152 are preferably oriented at an angle of approximately 0-60° with respect to an axis 158 extending therethrough and parallel to centerline axis 120. Vanes 152 will preferably each have a height 160 which is measured across opposite ends (i.e., in the radial direction relative to centerline axis 120 of mixing assembly 100). Since vanes 152 are substantially uniformly spaced circumferentially, a plurality of substantially uniform passages 162 are defined between adjacent vanes 152. It will be noted that vanes 152 preferably extend from inner end 164 of swirler 146 to outer end 166 thereof. Nevertheless, vanes 152 may extend only part of the way from inner end 164 to outer end 166 so that the tips thereof are stepped or lie on a different annulus. It will further be understood that swirler 146 may include vanes having different configurations so as to shape the passages in a desirable manner, as disclosed in a patent application entitled "Swirler Arrangement For Mixer Assembly and is utilized to provide the counter swirling flow in annular cavity 126.

It will be understood that air flowing through first swirler 144 will be swirled in a first direction and air flowing through second swirler 146 will preferably be swirled in a direction opposite the first direction. In this way, an intense mixing region 168 of air and fuel is created within annular cavity 126 having an enhanced total kinetic energy. By properly configuring swirlers 144 and 146, intense mixing region 168 is substantially centered within annular cavity 126, positioned axially adjacent fuel injection ports 128 and has a designated area. The configuration of the vanes in swirlers 144 and 146 may be altered to vary the swirl direction of air flowing therethrough and not be limited to the exemplary swirl directions indicated hereinabove.

It will be seen that height 151 of first swirler vanes 150 is preferably greater than height 160 of second swirler vanes 152. Accordingly, a relatively greater amount of air flows through first swirler 144 than through second swirler 146 due to the greater passage area therefor. The relative heights of swirlers 144 and 146 may be varied as desired to alter the distribution of air therethrough, so the sizes depicted are only illustrative.

Fuel manifold 106, as stated above, is located between pilot mixer 102 and main mixer 104 and is in flow communication with a fuel supply. In particular, outer radial wall 138 of centerbody outer shell 140 forms an outer surface 170 of fuel manifold 106, and a shroud member 172 is configured to provide an inner surface 174 and an aft surface 176. Fuel injection ports 128 are in flow communication with fuel manifold and spaced circumferentially around centerbody outer shell 140. As shown and described in a patent application entitled "Mixer Assembly For Combustor Of A Gas Turbine Engine Having A Main Mixer With Improved Fuel Penetration," filed concurrently herewith and also owned by the assignee of the present invention, fuel injection ports 128 are preferably positioned axially adjacent ramp portion 142 of centerbody outer shell 140 so that fuel is provided in upstream end 127 of annular cavity 126. In this way, fuel is preferably mixed with the air in intense mixing region 168 before entering downstream end 131 of annular cavity 126. Regardless of the axial location of fuel injection ports 128, it is intended that the fuel be injected at least a specified distance into a middle radial portion of annular cavity 126 and away from the surface of inner wall 138.

It will be appreciated that injection of the fuel into the desired location of annular cavity 126 is a function of providing an air flow therein which accommodates such injected fuel (instead of forcing the fuel against inner radial wall 138), as well as positioning fuel injection ports 128 so as to inject fuel in the manner best suited to the air flow. In addition, at least one row of circumferentially spaced purge holes is provided adjacent to and between each fuel injection port 128 to assist the injected fuel in its intended path. Such purge holes also assist in preventing injected fuel from collecting along inner radial wall 138. More specifically, it will be seen in FIGS. 3, 4, 7 and 11 that a first row of purge holes 179 is located immediately upstream of and between fuel injection ports 128, a second row of purge holes 180 is located immediately downstream of and between fuel injection ports 128, and third and fourth rows of purge holes 181 and 182 are located between adjacent fuel injection ports 128. Depending on the axial location of fuel injection ports 128 and on the particular characteristics of mixing assembly 100, alternative configurations and locations of purge holes may be utilized. Moreover, it will be noted that an additional row of purge holes may be included upstream or downstream of fuel injection ports 128.

In order to further facilitate injection of the fuel from fuel injection ports 128 into annular cavity 126, it is also preferred that a post member 190 having an inner passage 191 be associated with each such fuel injection port 128. It will be seen that post member 190 preferably extends from fuel injection port 128 through an air cavity 192 supplying compressed air to all applicable purge holes discussed hereinabove and through inner wall 138. In this way, fuel not only is injected directly into annular cavity 126, but the fuel is better able to travel into a middle annular portion of annular cavity 126 with the assistance of purge holes 179, 180, 181 and 182.

Figure 4:
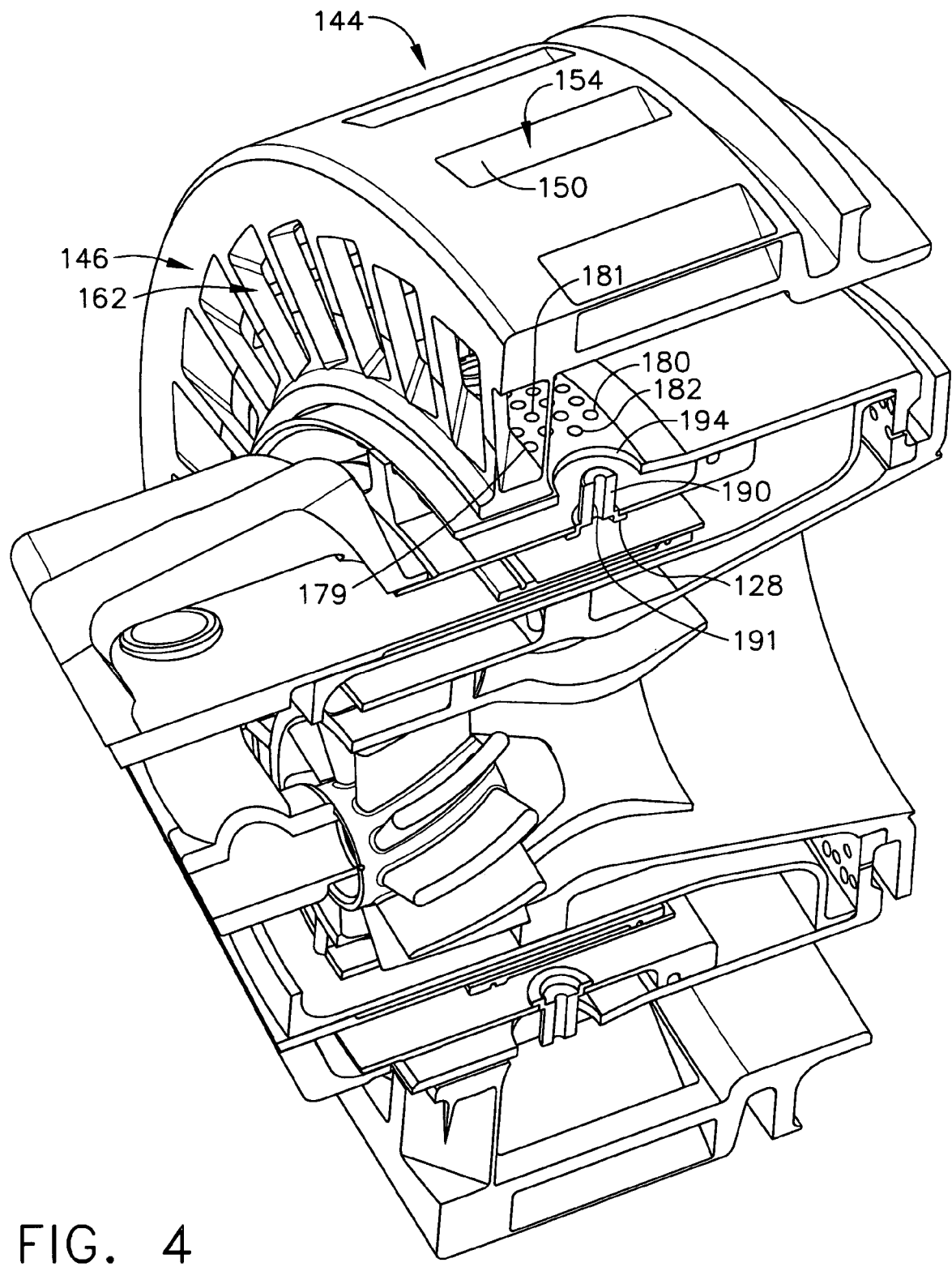
FIG. 4 is a partial perspective view of the mixer assembly depicted in FIGS. 2 and 3, where a first embodiment of the air assist passages is shown.
Figure 5:
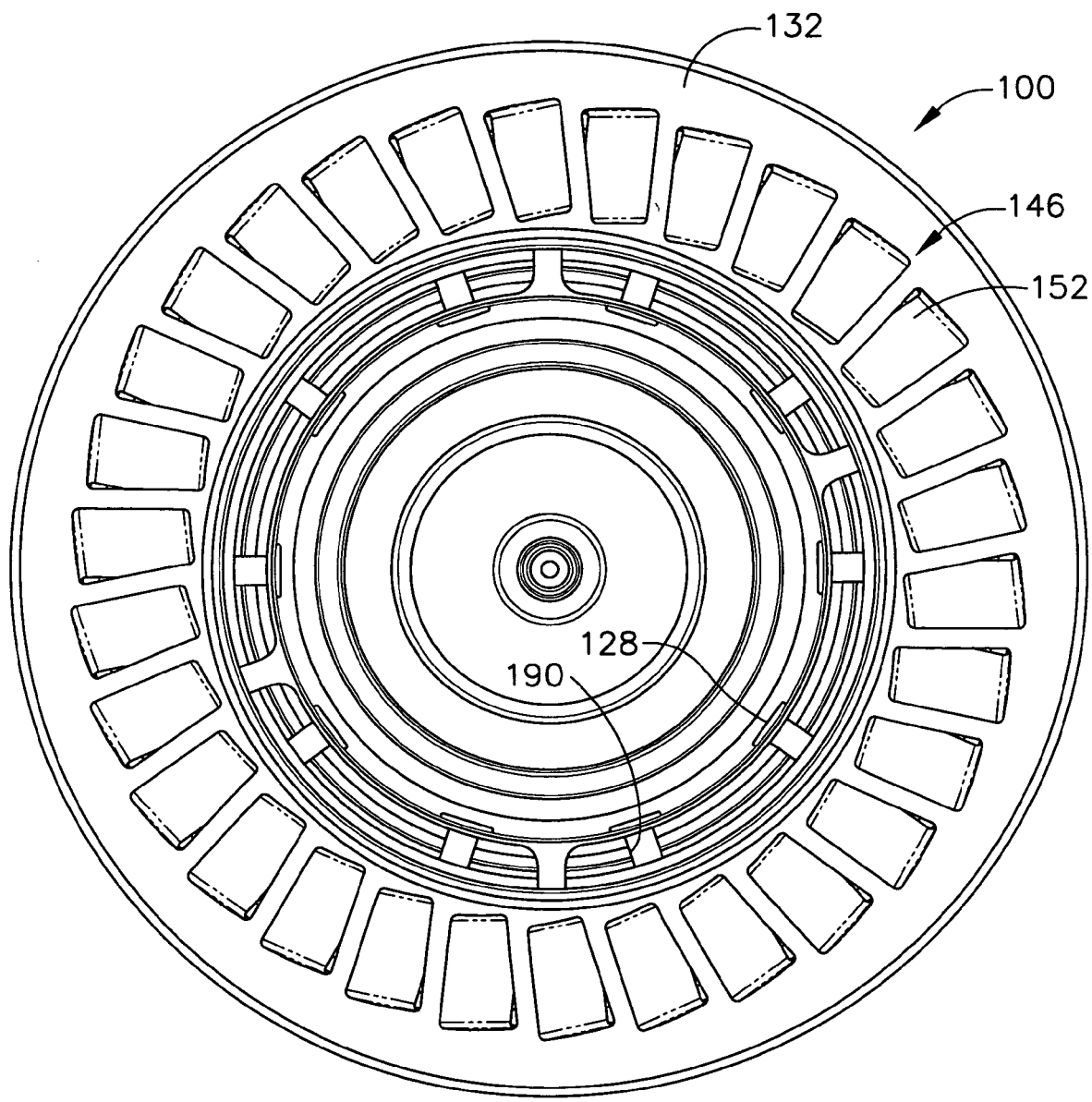
FIG. 5 is a front view of the mixer assembly depicted in FIGS. 2-4.
Figure 6:
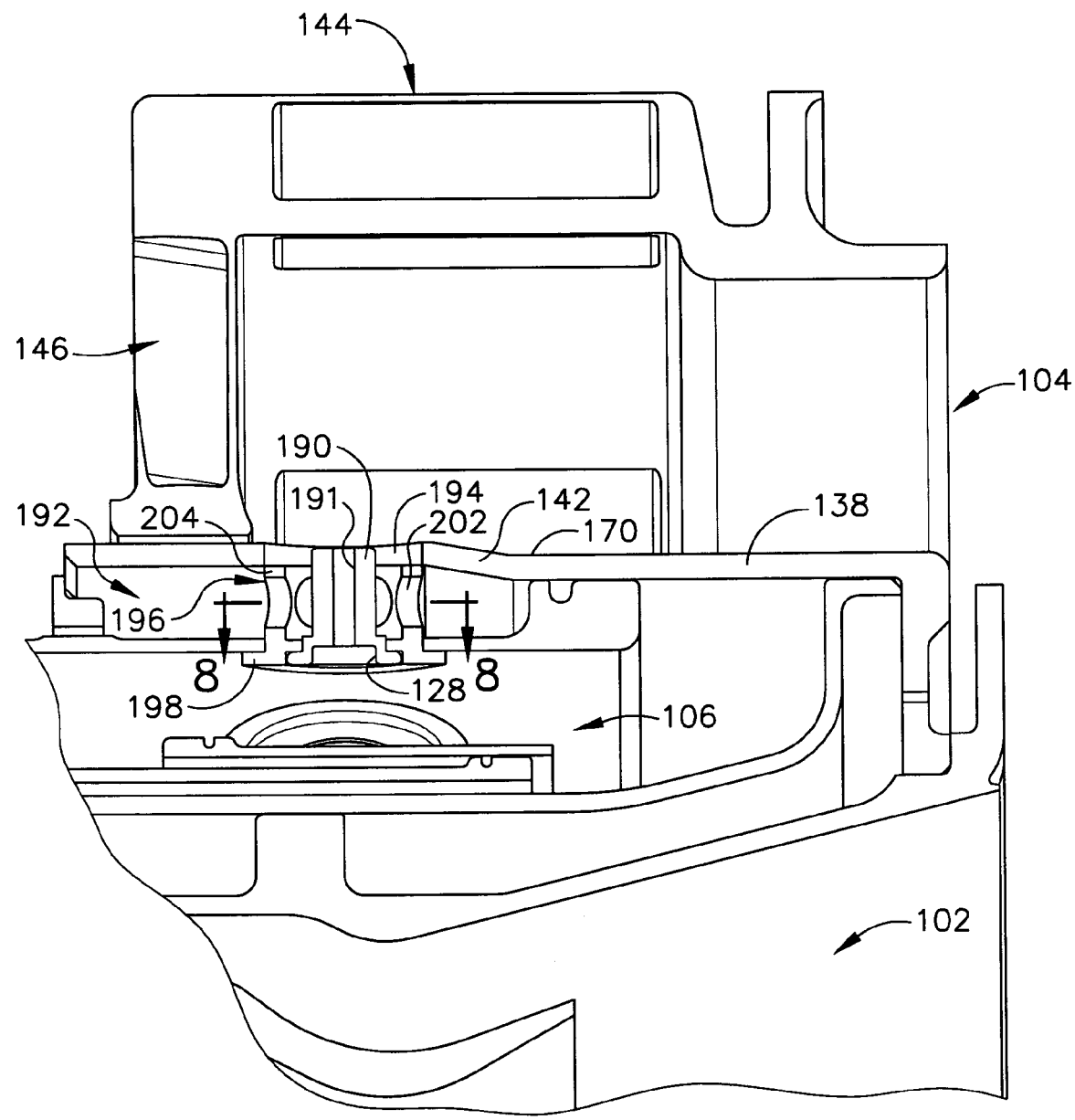
FIG. 6 is an enlarged partial section view of the mixer assembly depicted in FIGS. 2 and 3, where a second embodiment of the air assist passages is shown.
Figure 7:
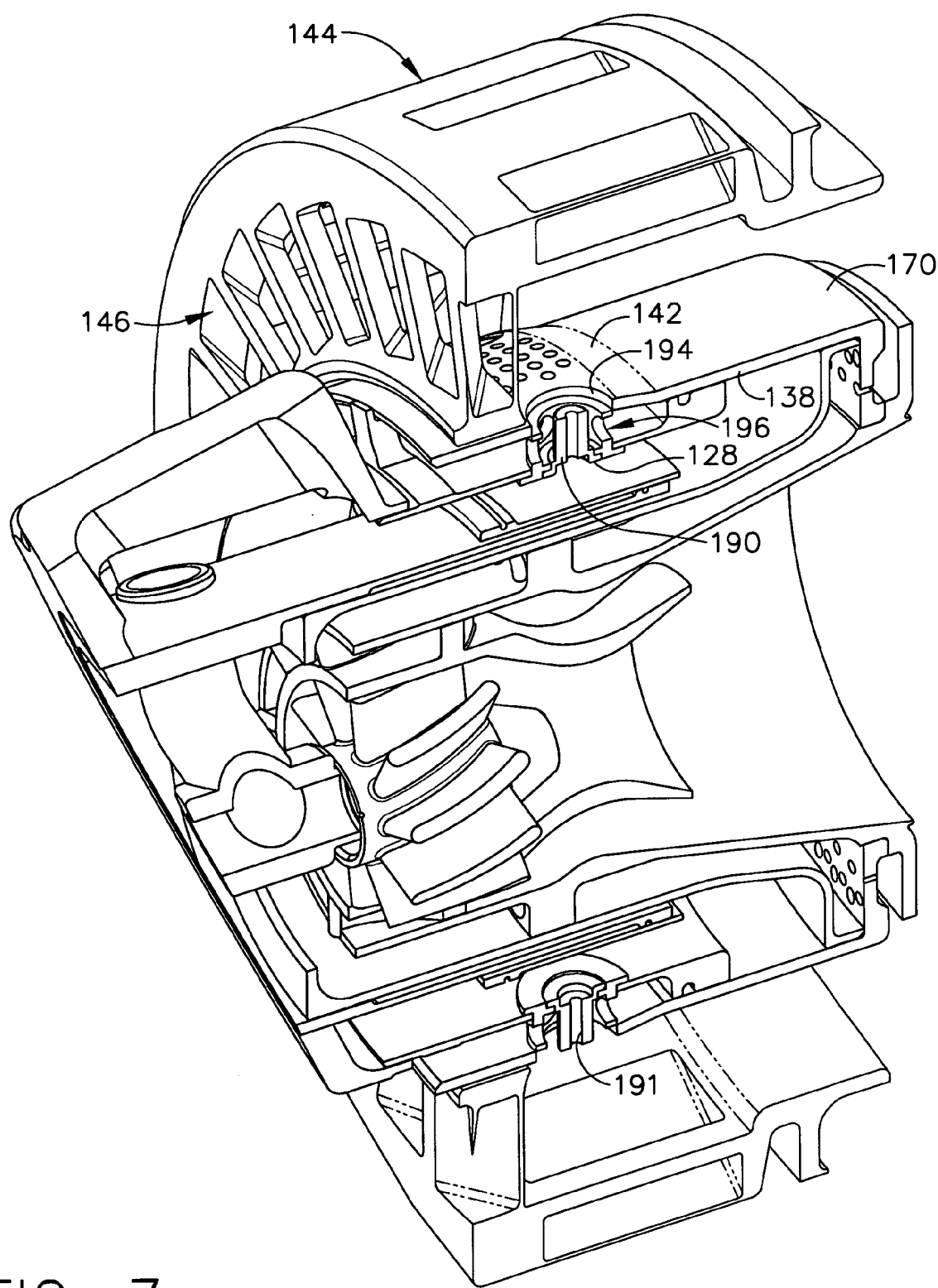
FIG. 7 is a partial perspective view of the mixer assembly depicted in FIG. 6.
Figure 8:
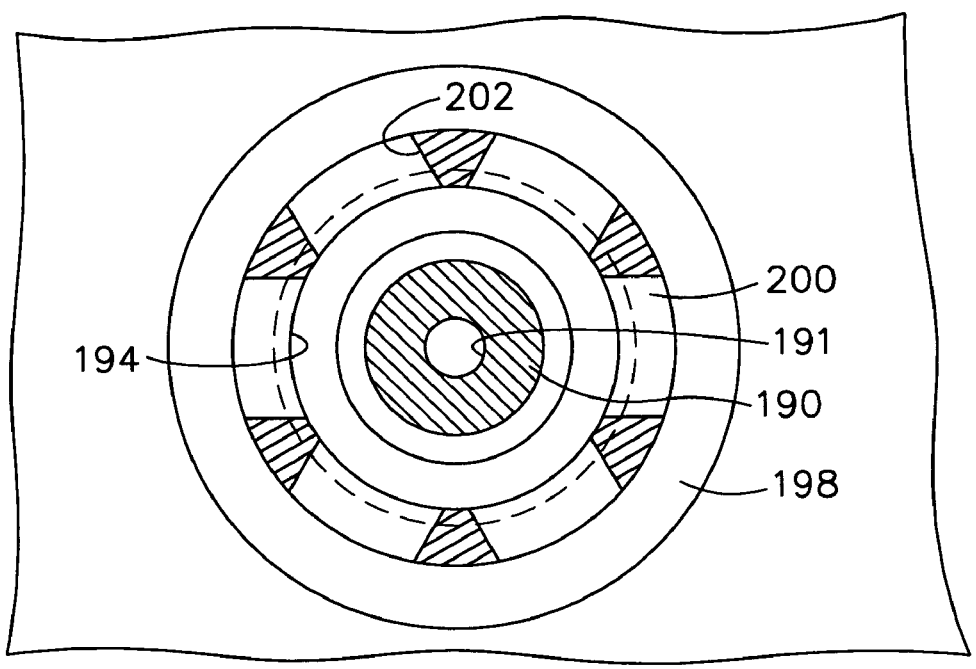
FIG. 8 is a top view of the mixer assembly depicted in FIGS. 6 and 7 taken along line 8-8 of FIG. 6.
Figure 9:
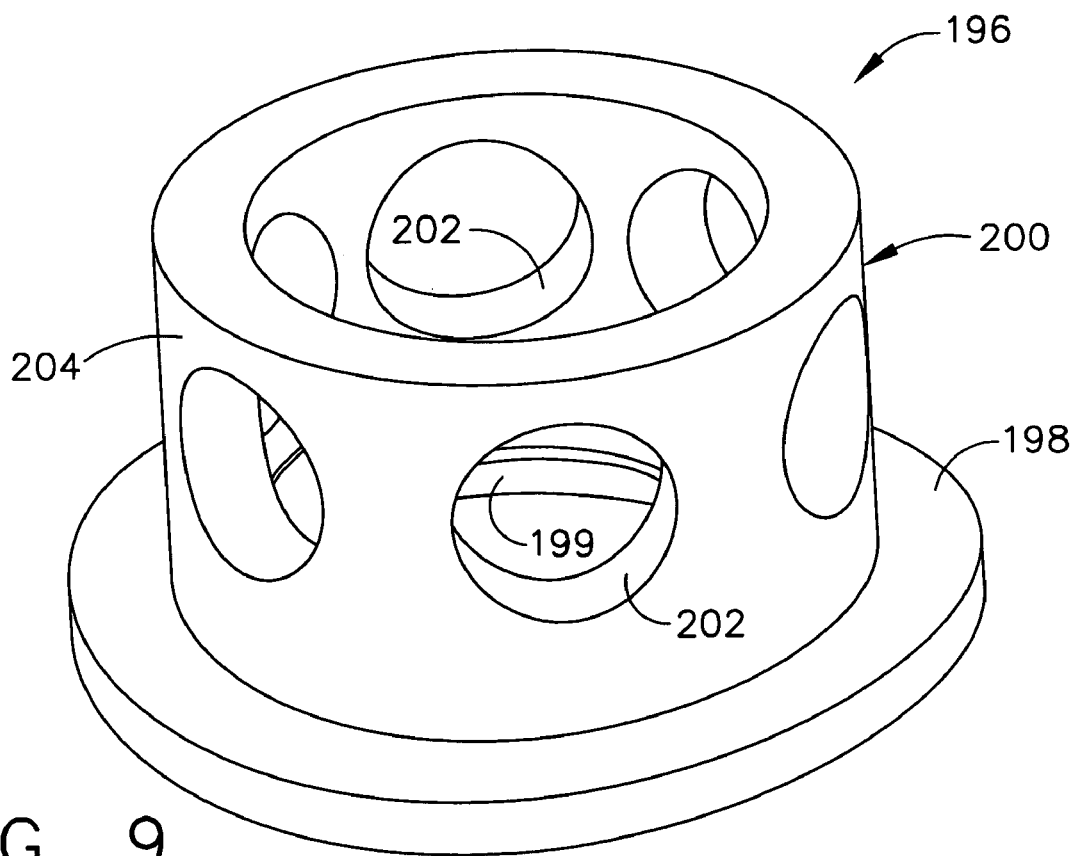
FIG. 9 is a perspective view of a swirler member associated with the air assist passages depicted in FIGS. 6-8.
Figure 10:
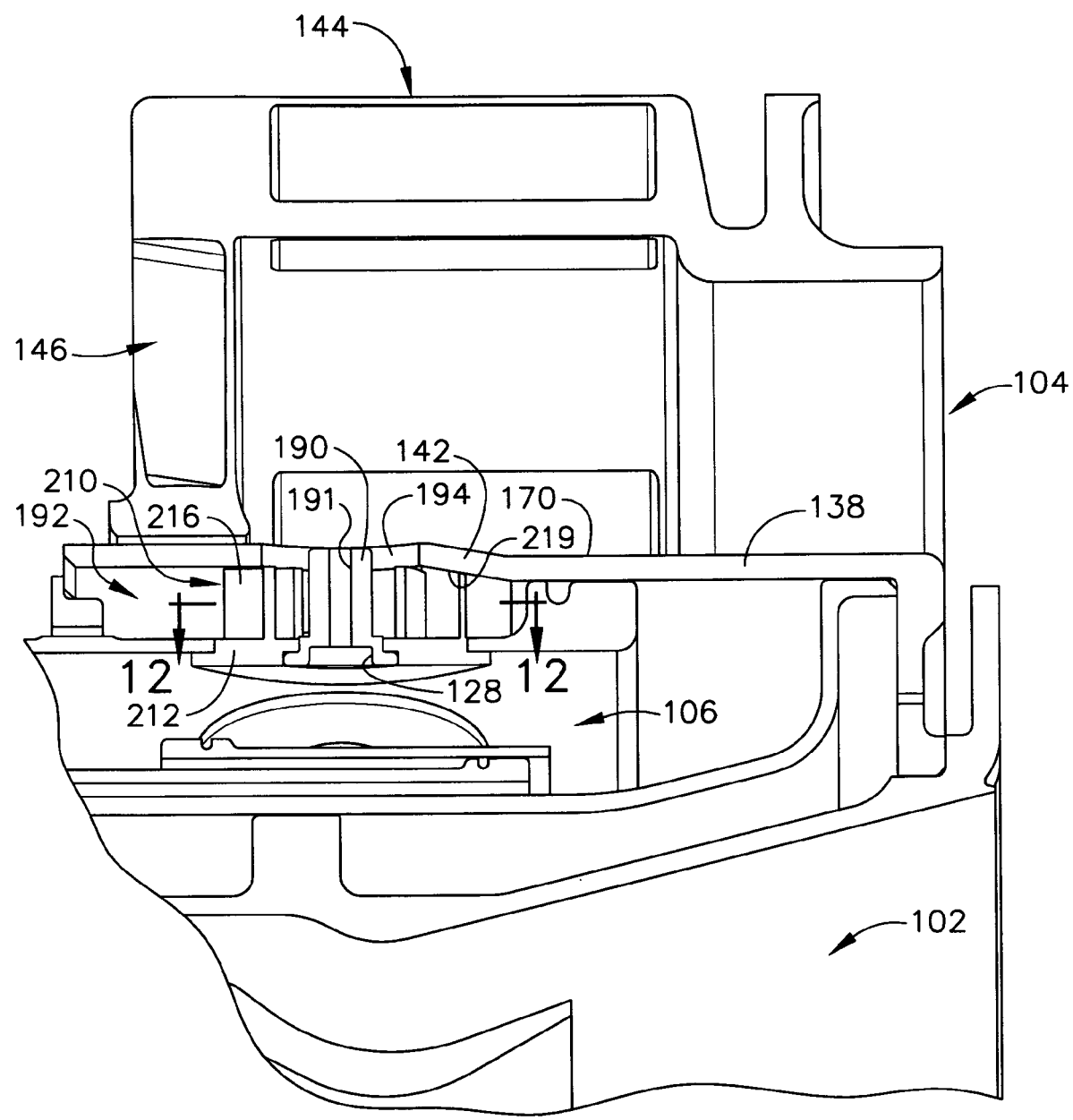
FIG. 10 is an enlarged partial section view of the mixer assembly depicted in FIGS. 2 and 3, where a third embodiment of the air assist passages is shown.
Figure 11:
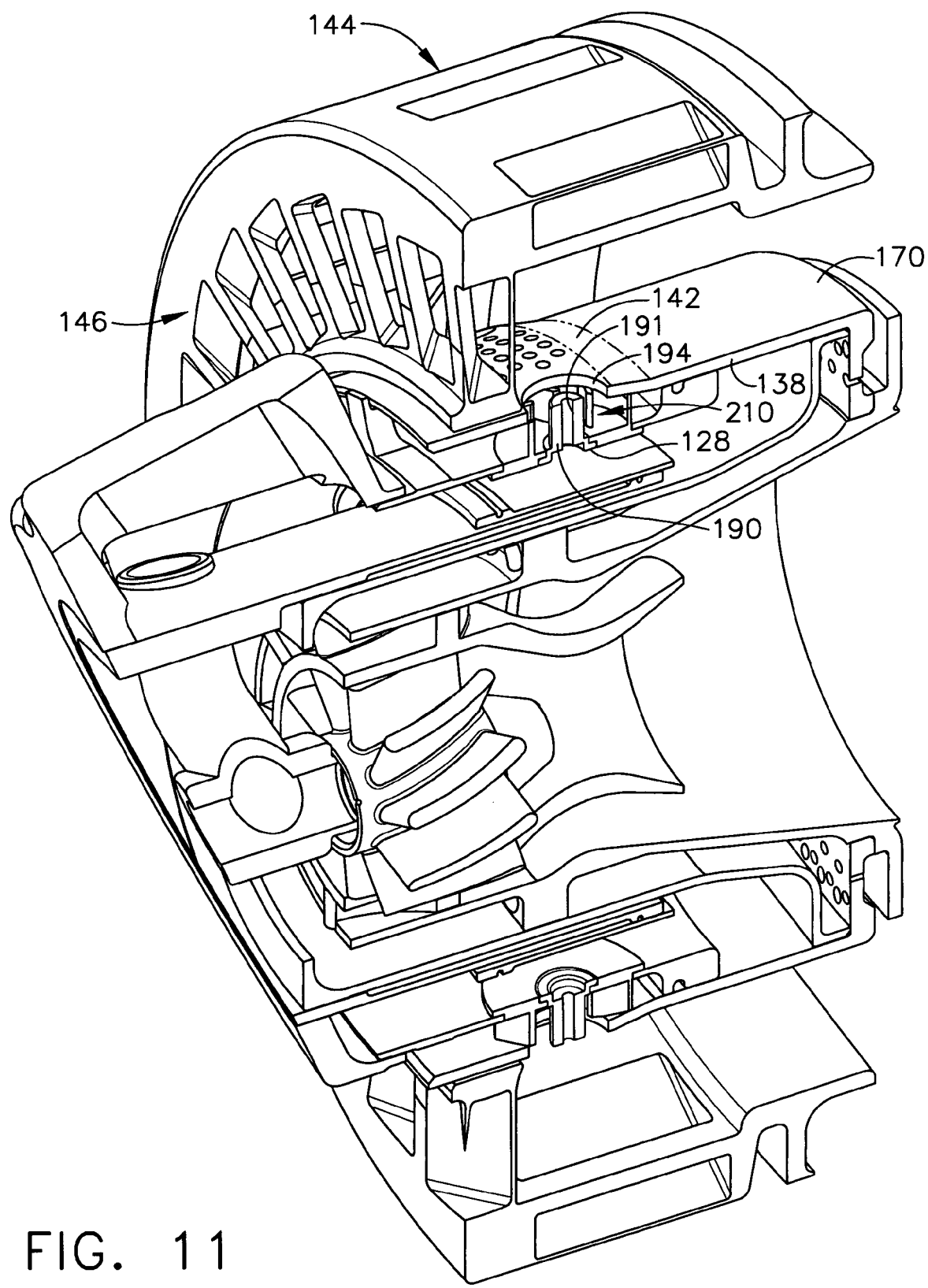
FIG. 11 is a partial perspective view of the mixer assembly depicted in FIG. 10.
Figure 12:
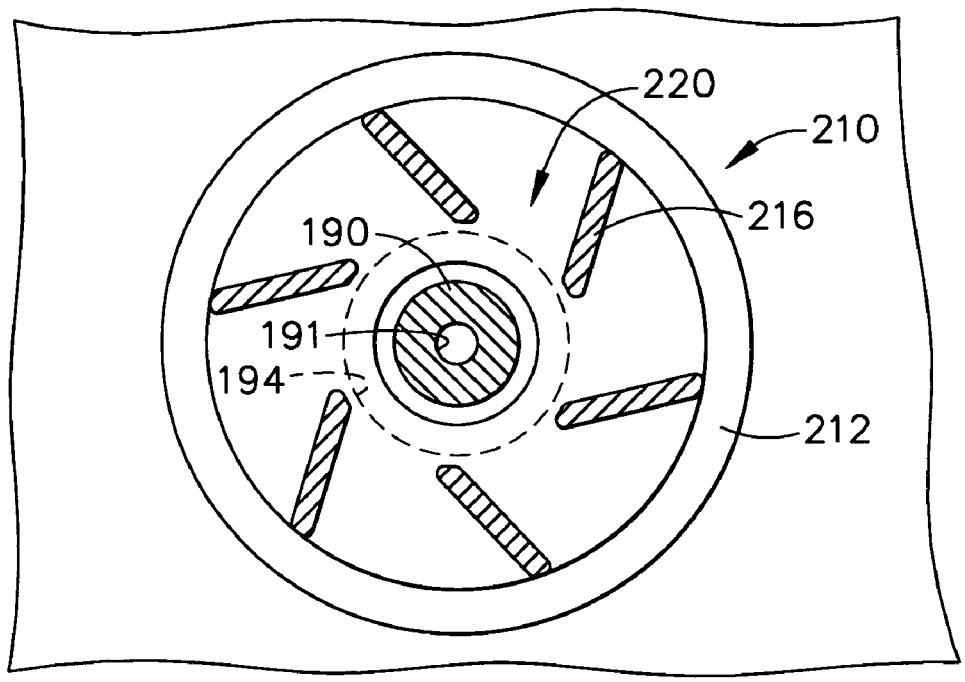
FIG. 12 is a top view of the mixer assembly depicted in FIGS. 10 and 11 taken along line 12-12 of FIG. 10; and, FIG. 13 is a perspective view of an alternative swirler member associated with the air assist passages depicted in FIGS. 10-12.
Figure 13:
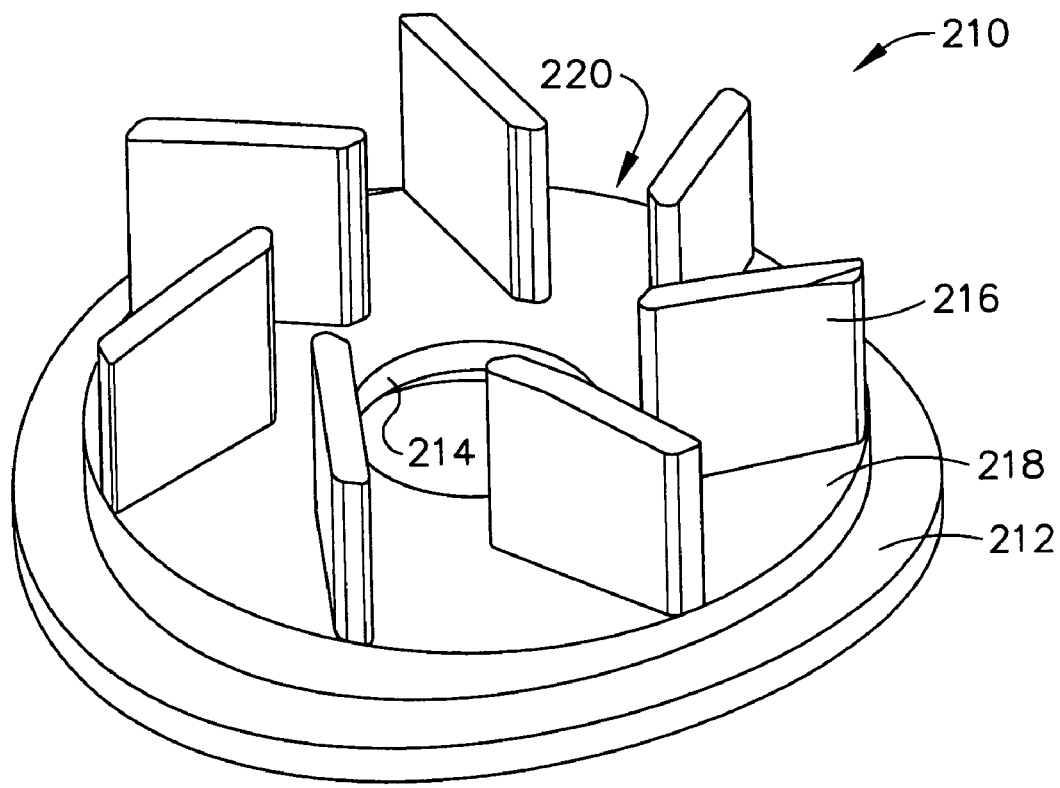

As shown in FIGS. 3 and 4, a passage 194 is preferably provided which surrounds post member 190 and is in flow communication with air cavity 192 so that a jet of air envelops the fuel as it is injected into annular cavity 126. Accordingly, the fuel is better able to penetrate into annular cavity 126 a desired amount.

In order to provide a swirl to the air jet provide by passage 194, a swirler member 196 may be provided around post member 190 which extends from fuel injection port 128 to outer surface 170 of fuel manifold 106 (see FIGS. 6-9). More specifically, swirling member 196 includes a substantially planar first ring-shaped portion 198 having an opening 199 which functions to provide a base and seals the area around fuel injection port 128. A second ring-shaped portion 200 extends from first portion 198 and includes a plurality of spaced openings 202 formed in a side wall 204 thereof Accordingly, compressed air from air cavity 192 enters swirler member 196 through openings 202 in a manner which imparts a swirl to the jet exiting passage 194.

An alternative swirler member 210 is shown in FIGS. 10-13. As seen therein, swirler member 210 likewise includes a substantially planar ring-shaped portion 212 having an opening 214 which functions to provide a base and seals the area around fuel injection port 128. A plurality of vanes 216 extend from a top surface 218 of ring-shaped portion 212 to a bottom surface 219 of inner wall 138 of annular cavity 126, where a passage 220 is formed between adjacent vanes 216. Thus, compressed air from air cavity 192 enters swirler member 210 via passages 220 in a manner which imparts swirl to the jet exiting passage 194.

When fuel is provided to main mixer 104, an annular, secondary combustion zone 178 is provided in combustion chamber 62 that is radially outwardly spaced from and concentrically surrounds primary combustion zone 122. Depending upon the size of gas turbine engine 10, as many as twenty or so mixer assemblies 100 can be disposed in a circular array at inlet 64 of combustion chamber 62.

Although particular embodiments of the present invention have been illustrated and described, it will be apparent to those skilled in the art that various changes and modifications can be made without departing from the spirit of the present invention. Accordingly, it is intended to encompass within the appended claims all such changes and modification that fall within the scope of the present invention.

What is claimed is:

1. A mixer assembly for use in a combustion chamber of a gas turbine engine, comprising:
    (a) a pilot mixer including an annular pilot housing having a hollow interior and a pilot fuel nozzle mounted in said housing and adapted for dispensing droplets of fuel to said hollow interior of said pilot housing;
    (b) a main mixer including:
        (1) a main housing surrounding said pilot housing and defining an annular cavity;
        (2) a plurality of fuel injection ports for introducing fuel into said annular cavity;
        (3) a post member associated with and extending from each said fuel injection port to an inner surface of said annular cavity, said post member including an inner passage therethrough in flow communication with said fuel injection port;
        (4) a passage surrounding each said post member, wherein air is provided therefrom to envelop fuel injected into said annular cavity; and,
        (5) a swirler arrangement including at least one swirler positioned upstream from said fuel injection ports, wherein each swirler of said arrangement has a plurality of vanes for swirling air traveling through such swirler to mix air and said droplets of fuel dispensed by said fuel injection ports; and, (c) a fuel manifold positioned between said pilot mixer and said main mixer, wherein said plurality of fuel injection ports for introducing fuel into said main mixer cavity are in flow communication with said fuel manifold.

2. The mixer assembly of claim 1, wherein air flows substantially straight through said passages surrounding said post members into said annular cavity.

3. The mixer assembly of claim 1, wherein air is swirled through said passages surrounding said post members into said annular cavity.

4. The mixer assembly of claim 3, wherein air is swirled through said passages surrounding said post members at an angle of about 20° to about 40° with respect to an axis oriented substantially perpendicular to a centerline axis through said mixer assembly.

5. The mixer assembly of claim 3, wherein air through said passages surrounding said post members is swirled in a direction opposite air swirled by said swirler.

6. The mixer assembly of claim 1, further comprising a swirler member including:
   (a) a substantially planar first ring-shaped portion having a central opening therein adjacent said fuel injection port; and,
   (b) a second ring-shaped portion extending from said first portion and including a plurality of spaced openings formed in a side wall thereof;
wherein compressed air enters said spaced openings to impart swirl to air exiting said passage surrounding said post member.

7. The mixer assembly of claim 1, further comprising a swirler member including:
   (a) a substantially planar ring-shaped portion having a central opening therein adjacent said fuel injection port; and,
   (b) a plurality of vanes extending from a top surface of said ring-shaped portion so that a passage is formed between adjacent vanes;
wherein compressed air enters said passages to impart swirl to air exiting said passage surrounding said post member.

8. The mixer assembly of claim 1, wherein said passages surrounding said post members are oriented substantially coaxially around said post members.

9. The mixer assembly of claim 1, wherein a ratio of fuel through said fuel injection ports to air through said passages surrounding said post members is about 3 to about 6.

10. The mixer assembly of claim 1, further comprising openings between each said fuel injection port in flow communication with compressed air.

11. The mixer assembly of claim 1, said swirler arrangement further comprising at least one swirler oriented substantially radially to a centerline axis through said mixer assembly.

12. The mixer assembly of claim 1, said swirler arrangement further comprising at least one swirler oriented at an acute angle to a centerline axis through said mixer assembly.

13. The mixer assembly of claim 1, said swirler arrangement further comprising at least one swirler oriented substantially parallel to a centerline axis through said mixer assembly.

14. The mixer assembly of claim 1, wherein fuel droplets from said fuel injection ports are able to penetrate to a designated position within said annular cavity.

15. The mixer assembly of claim 1, further comprising a plurality of purge openings located downstream of said fuel injection ports in flow communication with compressed air.

16. The mixer assembly of claim 15, wherein said purge openings are spaced in an annular fashion around said annular cavity so as to be substantially planar.

17. The mixer assembly of claim 16, wherein said openings are located downstream of said swirler arrangement.

18. The mixer assembly of claim 1, wherein said fuel injection ports are positioned adjacent a ramp portion of said annular cavity located at an upstream end thereof.

19. The mixer assembly of claim 1, wherein compressed air is supplied to said passages surrounding said post members by means of an air cavity located between said fuel manifold and said annular cavity.

20. A mixer assembly for use in a combustion chamber of a gas turbine engine, comprising:
   (a) a pilot mixer including an annular pilot housing having a hollow interior and a pilot fuel nozzle mounted in said housing and adapted for dispensing droplets of fuel to said hollow interior of said pilot housing;
   (b) a main mixer including:
      (1) a main housing surrounding said pilot housing and defining an annular cavity;
      (2) a plurality of fuel injection ports for introducing fuel into said annular cavity;
      (3) a plurality of circumferentially spaced passages located in a downstream portion of said annular cavity, wherein air is provided to force a fuel/air mixture from residing along an inner surface of said annular cavity; and,
      (4) a swirler arrangement including at least one swirler positioned upstream from said fuel injection ports, wherein each swirler of said arrangement has a plurality of vanes for swirling air traveling through such swirler to mix air and said droplets of fuel dispensed by said fuel injection portions; and,
   (d) a fuel manifold positioned between said pilot mixer and said main mixer, wherein said plurality of fuel injection ports for introducing fuel into said main mixer cavity are in flow communication with said fuel manifold.

* * * * *